United States Patent [19]

Kato

[11] 4,384,705

[45] May 24, 1983

[54] STOP VALVE

[75] Inventor: Shigenobu Kato, Asaka, Japan

[73] Assignee: Sekisui Kagaku Kogyo Kabushiki Kaisha, Osaka, Japan

[21] Appl. No.: 311,098

[22] Filed: Oct. 13, 1981

[30] Foreign Application Priority Data

Oct. 13, 1980 [JP] Japan .................................. 55/142809

[51] Int. Cl.³ ............................................ F16K 31/50
[52] U.S. Cl. ..................................... 251/214; 251/264
[58] Field of Search ............... 251/214, 215, 218, 221, 251/225, 273, 274, 264, 265, 368

[56] References Cited

U.S. PATENT DOCUMENTS

| 1,642,412 | 9/1927 | Farnsworth | 251/265 |
| 2,525,928 | 10/1950 | McRae | 251/218 |
| 2,883,145 | 4/1959 | Sage | 251/214 |
| 3,107,082 | 10/1963 | Reynolds | 251/214 |
| 3,222,027 | 12/1965 | Gilleeny | 251/264 |
| 3,443,789 | 5/1969 | Glasgow et al. | 251/214 |
| 3,943,969 | 3/1976 | Rubin et al. | 251/368 |

FOREIGN PATENT DOCUMENTS

| 1218832 | 6/1966 | Fed. Rep. of Germany | 251/214 |
| 120495 | 11/1945 | United Kingdom | 251/214 |
| 997201 | 7/1965 | United Kingdom | 251/214 |

Primary Examiner—George L. Walton
Attorney, Agent, or Firm—Sughrue, Mion, Zinn, Macpeak and Seas

[57] ABSTRACT

A stop valve includes a main body which defines a fluid passage and a valve chamber. The stop valve further includes a spindle having one end connected to a handle and the other end inserted into said valve chamber, a valve seat positioned in said fluid passage and confronting said valve body, and a cap member positioned above said valve chamber. The outer end of the spindle is coupled rotatably to the valve body, while the rotation of the valve body is prevented by a rotation preventive means. A packing is interposed between the valve body and the valve chamber. The valve body is in sliding contact with said packing along the axial direction thereof during operation, upon rotation of the spindle about its axis.

3 Claims, 3 Drawing Figures

FIG. 1
FIG. 2
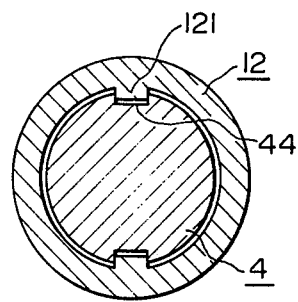
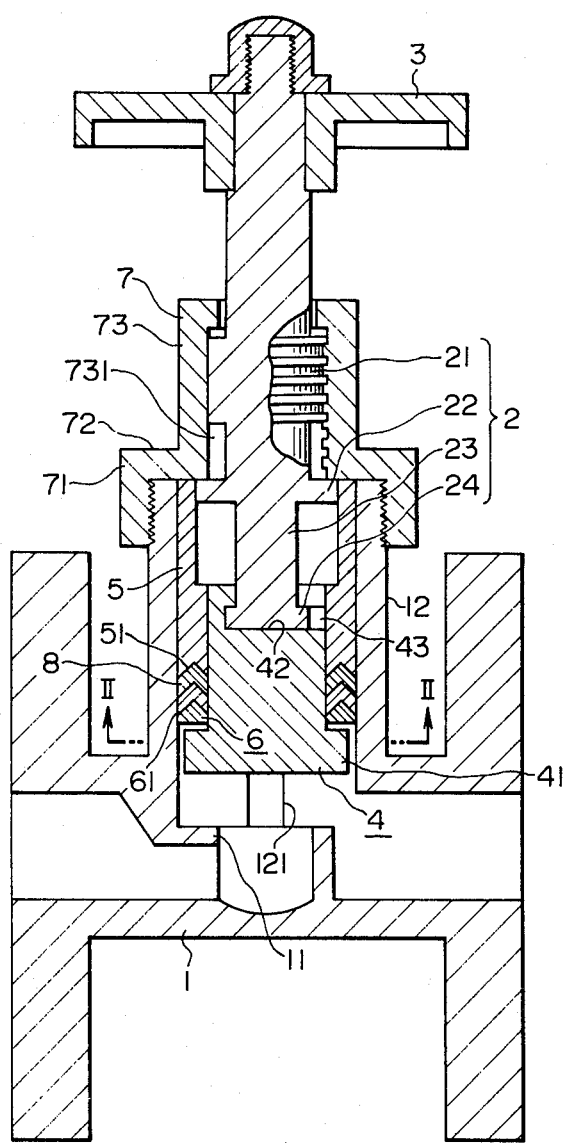

STOP VALVE

BACKGROUND OF THE INVENTION

The present invention relates to a stop valve. An example of the conventional stop valve is disclosed in Japanese Utility Model Publication No. 28151/61 and is shown in FIG. 3. According to this conventional structure, a valve seat 3' is positioned within a fluid path formed in a main body 1'. The valve seat 3' confronts a valve body 4' disposed at a lower end of a valve rod (spindle) 6'. The valve rod 6' is centrally disposed within a cap member 2' and is threadingly engaged therewith. The cap member 2' is disposed above the main body 1' and is engaged therewith. Upon rotation of a handle 16' connected to an upper end of the valve rod 6', the valve rod 6' moves along its axial direction within the cap member 2', to thereby control the degree of opening of the valve body 4' relative to the valve seat 3'. Further, a gland chamber is provided at the upper half inner portion of the cap member 2' so as to surround the valve rod 6'. Within the hollow gland chamber, a packing receiver 8', a gland packing 10' and a packing holder 9' are successively fitted.

With this structure, direct rotational sliding contact is made between the gland packing 10' and the valve rod 6', since the valve rod 6' not only rotates but also moves along its axial direction. Therefore, during operation, the gland packing 10' is subject to frictional force along both the circumferential and axial directions of the valve rod 6', so that the packing is excessively worn. The amount of wear is disadvantageously increased due to both the rotational and axial movement of the valve rod 6' and, due to the repetition of the operations, the packing must be often replaced with a new one. Further, since liquid may be introduced into the threadingly engaging portion between the valve rod 6' and the cap member 2', foreign materials may be accumulated thereon and corrosion may result, to thus lower the efficiency of the stop valve. Such a disadvantage may become most apparent when a liquid such as slurry flows through the stop valve.

Another type of the conventional stop valve is disclosed in Japanese Industrial Standard (JIS) No. B 2041. This publication discloses a flanged globe valve which is referred to as an external thread type. According to this stop valve, a yoke member forming a thread adapted to provide vertical movement of a valve rod is provided. Since the yoke is positioned above a cap member, the thread portion is free from liquid contact. However, a packing is employed in the device which therefore still suffers from the disadvantages mentioned above in connections with the first conventional device.

SUMMARY OF THE INVENTION

It is therefore an object of the present invention to overcome the above-mentioned drawbacks and to provide an improved stop valve.

Another object of the invention is to provide such a stop valve capable of avoiding direct contact between the fluid and a threaded portion of a spindle, to thus maintain operability.

Still another object of the invention is to eliminate damage to a packing due to frictional wear.

These and other objects of the invention will be attained in a type of stop valve wherein one end of the spindle is inserted in a valve chamber of a main body, and a valve body is fitted to the end of the spindle to control the degree of opening of the valve body relative to a valve seat upon rotation of the spindle along the circumferential direction thereof. According to the present invention, the spindle is rotatably coupled to the valve body, whereas the rotation of the valve body with respect to the valve chamber is prevented because of the provision of a rotation preventive means. The preventive means comprises protrusions radially inwardly protruding from an inner surface of the valve chamber (stationary member) and extending along the axial direction thereof, and recesses formed in an outer surface of the valve body to engage with said projections. Thus, the rotation of the spindle is not transmitted to the valve body, but only the axial displacement of the spindle is transmitted. Further, according to the present invention, a packing is interposed between the valve body and an inner peripheral surface of the valve chamber, to prevent fluid from being leaked from the fluid passage to the threaded portion between the spindle and a cap member adapted to guide axial movement of the spindle.

BRIEF DESCRIPTION OF THE DRAWINGS

In the drawings:

FIG. 1 is a cross-sectional view showing a stop valve according to the present invention;

FIG. 2 is a transverse cross-sectional view taken along the line II—II of FIG. I.

DETAILED DESCRIPTION OF THE PREFERRED EMBODIMENTS

Figure 3:
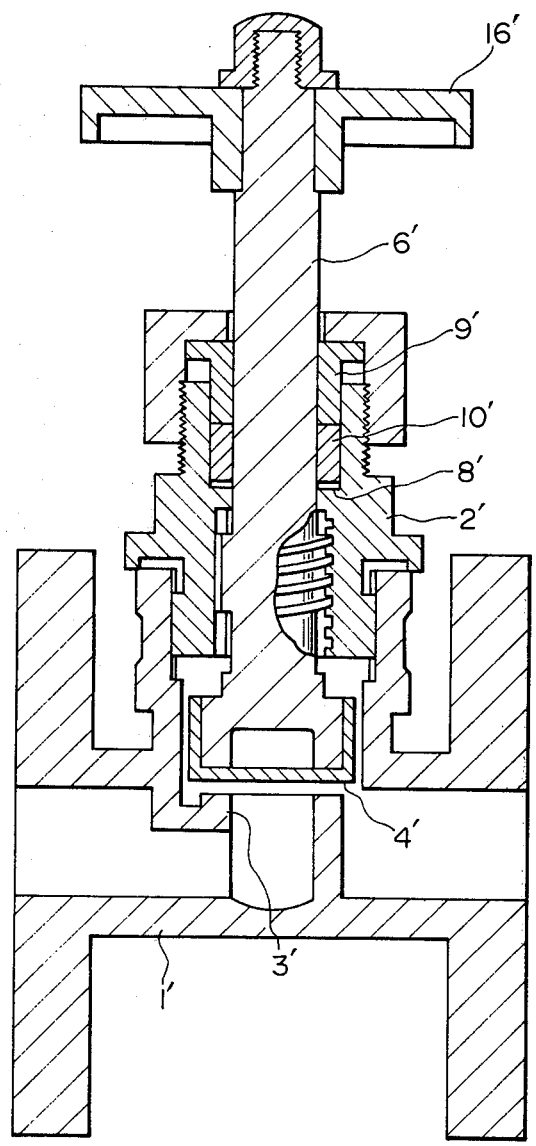
FIG. 3 is a cross-sectional view showing a conventional stop valve.

A stop valve according to the present invention generally includes a main body 1, a spindle 2, a handle 3, a vave body 4, a packing holder 5, a packing receiver 6 and a cap 7, each being formed of a chemically resistant synthetic resin such as polyvinyl chloride.

The main body 1 is formed with a fluid passage adapted to provide fluid communication of one connection part to the other. At the central portion of the passage, a valve seat 11 is provided, and above the valve seat 11, a hollow valve chamber 12 is disposed. The valve chamber 12 has an inner surface integrally provided with projections 121 projecting radially inwardly and extending along the axial direction thereof. The projections 121 are adapted to prevent the valve body 4 from rotation about its axis. Further, a male thread is formed at an upper outer peripheral portion of the valve chamber 12.

The spindle 2 is formed with a male thread portion 21 at a longitudinally center portion thereof, and has a flange 22 and a small diameter portion 23. The spindle 2 has one end provided with a disc 24 radially outwardly protruded from the small diameter portion, and the other end detachably provided with the handle 3.

The valve body 4 is of cylindrical shape and has one end portion with a water block 41 having a diameter larger than that of the valve body cylinder. The valve body 4 has the other end formed with a fitting hole 42 adapted to permit the disc 24 to be slidingly rotated therein and preventing the disc from being removed therefrom along the axial direction. A notch 43 is formed in the body along a direction transverse to its axis so that the disc can be introduced into the fitting hole 42. The water block 41 is formed with recesses 44 at an outer peripheral portion thereof so as to engage the projections 121 of the valve chamber 12.

The packing holder 5 has an outer diameter approximately equal to an inner diameter of the valve chamber 12, and has an inner peripheral surface having a stepped portion. The inner surface provides a portion having an inner diameter slightly greater than the outer diameter of the flange 22 of the spindle 2 and a portion having a diameter slightly greater than the outer diameter of the cylindrical portion of the valve body 4. The latter portion of the packing holder 5 is provided with V-shaped groove 51 at the end thereof.

The packing receiver 6 has an outer diameter approximately equal to the inner diameter of the valve chamber 12 and has an inner diameter slightly greater than the outer diameter of the cylindrical portion of the valve body 4. The packing receiver 6 is provided with protrusion 61 which corresponds to the V-shaped groove 51 of the packing holder 5.

The cap 7 has a larger diameter portion 71 at the interior of which a female thread is formed to provide threading engagement with the male thread formed at the upper outer peripheral portion of the valve chamber 12, a stepped portion 72, and a small diameter portion 75 having an inner diameter smaller than the outer diameter of the flange 22 of the spindle 2 to serve as a stopper for the movement thereof. At the small diameter portion 73, a female thread 731 is formed adapted to threadinly engage the male thread 21 formed at the longigudinally center portion of the spindle 2. A V-shaped annular packing 8 is interposed between the V-shaped groove 51 and the V-shaped protrusion 61. The packing is formed of elastic meterial.

One end of the spindle 2 having the disc 24 is inserted into the valve chamber 12 of the main body 1. At the valve body 4, the disc 24 is fitted with the fitting hole 42, to thus rotatably couple the spindle 2 to the valve body 4. The protrusion 121 of the valve chamber 12 is engaged with the recess 44 of the valve body 4, so that the relative rotation therebetween along the circumferential direction is prevented. The cap 7 is engaged with the valve chamber 12 by the threading engagement between the male thread formed at the upper outer peripheral portion of the valve chamber 12 and the female thread formed at the large diameter portion 71 of the cap 7. Further, the female thread 731 formed at the small diameter portion 73 of the cap 7 is threadingly engaged with the male thread 21 formed at the center portion of the spindle 2. The upper planar end of the packing holder 5 is in contact with the stepped portion 71 of the cap 7, and the upper end of the spindle 2 is connected to the handle 3.

Upon rotation of the handle 3, the spindle 2 is rotated about its central axis, and at the same time the spindle is displaced along its axial direction because of the threading engagement with the cap 7. In this case, the disc 24 positioned within the fitting hole 42 of the valve body 4 is rotated therein together with the rotation of the portions 21, 22 and 23, and the valve body 4 is moved along axial direction. The movement of the valve body 4 provides the opening and closure of the valve seat 11 of the main body 1. During the movement of the valve body 4, the rotation of the valve body about its axis is prevented because of the engagement between the protrusions 121 and the recesses 44. Therefore, the valve body 4 is moved relative to the valve chamber 12 only along the axial direction thereof, sliding on the packing 8.

In view of the foregoing, according to the present invention, the spindle is rotatably coupled about its axis to the valve body, while the rotation of the valve body relative to the valve chamber is prevented. Therefore, the valve body is slidingly moved along the axial direction only, so that the packing interposed between the valve body and the valve chamber is subject to a frictional load only along its axial direction. Accordingly, damage to the packing is reduced and the packing provides longer service life and durability. Further, the direct contact between the fluid and the threading portions is prevented, to thereby maintain sufficient operability.

Specifically, according to the present invention, since the packing is interposed between the wall of the valve chamber and the valve body, fluid flowing through the stop valve is completely sealed at the packing. Therefore, liquid leakage into the threaded portion between the male thread of the spindle and the female thread of the cap can be prevented. As a result, no foreign material is accumulated onto the threaded portion, and corrosion of the threaded portion can be prevented, to thereby prevent "freezing" or jamming of the spindle. Further, because of the rotation preventive means disposed within the valve chamber, i.e., the protrusion of the valve chamber and recesses of the valve body, the valve body moves only along the axial direction of the spindle, in response to the rotation of the spindle, so that the valve body performs sliding engagement along the axial direction of the spindle with respect to the packing. As a result, frictional wear of the packing can be minimized, owing to the substantial reduction of the sliding length therebetween in comparison with the rotatingly axial sliding movement in the conventional structure.

While the invention has been described in detail and with reference to a specific embodiment thereof, it will be apparent to one skilled in the art that various changes and modifications can be made therein without departing from the spirit and scope of the invention.

What is claimed is:

1. In a stop valve including a main body defining a fluid passage and a valve chamber, a spindle having one end inserted into said valve chamber, a valve seat positioned in said fluid passage and a valve body positioned within said valve chamber and confronting said valve seat, the opening degree of said valve body relative to said valve seat being controlled by rotation of said spindle about its axis, the improvement comprising:

(a) said spindle being coupled to said valve body and being freely rotatable along a circumferential direction with respect to said valve body, wherein said spindle includes a threaded portion formed at a longitudinal center portion thereof, a flange adapted to confront with an inner surface of a packing holder, a small diameter portion positioned within said valve chamber and a disc portion provided at the end of said spindle, said threaded portion being engaged with a matching threaded portion of a cap member positioned above said valve body and surrounding said spindle, and positioned above said packing, said disc portion being rotatably coupled to said valve body;

(b) a rotation preventive means disposed between said valve body and said valve chamber to prevent rotation of said valve body relative to said valve chamber, wherein said rotation preventive means comprises protrusions radially inwardly projecting from an inner surface of said valve chamber and extending along the axial direction thereof, and corresponding recesses formed in an outer peripheral surface of said valve body to engage said protrusions; and (c) a packing interposed between said valve body and said valve chamber, wherein said packing is disposed between an annular packing receiver and a cylindrical packing holder, each disposed between said valve body and said valve chamber, confronting surfaces of said receiver and said holder being formed with a V-shaped projection and a V-shaped recess respectively to interpose said packing, wherein when said valve body is in a fully opened position an axial space exist between said packing receiver and said valve body to prevent imparting any varying compressional forces between said V-shaped projection and said V-shaped recess.

2. The improvement of claim 1, wherein said stop valve is formed of synthetic resin.

3. The improvement of claim 1, wherein said valve body comprises an upper portion in slidable contact with said annular packing receiver, said cylindrical packing holder, and said packing, a lower portion of a diameter substantially equal to the diameter of said valve chamber, said upper portion formed with a fitting hole provided along a transverse direction thereof, said disc portion of said spindle being rotatably engaged within said fitting hole.

* * * * *